UNITED STATES PATENT OFFICE.

JOSEPH J. MILLER, OF PITTSBURGH, PENNSYLVANIA, ASSIGNOR, BY MESNE ASSIGNMENTS, TO MACBETH-EVANS GLASS COMPANY, OF PITTSBURGH, PENNSYLVANIA, A CORPORATION OF PENNSYLVANIA.

OPAQUE SEMI-TRANSLUCENT GLASS.

1,245,487.     Specification of Letters Patent.     Patented Nov. 6, 1917.

No Drawing.     Application filed November 10, 1913. Serial No. 800,104.

*To all whom it may concern:*

Be it known that I, JOSEPH J. MILLER, a citizen of the United States of America, residing in the city of Pittsburgh, county of Allegheny, and State of Pennsylvania, have invented new and useful Improvements in Opaque Semi-Translucent Glass, of which the following is a specification.

This invention has reference to the production of a new opaque semi-translucent glass.

It is the object of my invention to produce a semi-opaque, semi-translucent glass by use of a new combination of ingredients fused upon a plan resulting in a new semi-opaque, semi-translucent glass.

The invention consists of a new semi-opaque, semi-translucent glass, produced by new ingredients combined in a novel way and fused in accordance with newly discovered procedure, which if followed, enables the color, texture and other properties of the product to be controlled to a greater extent than heretofore. More particularly my invention consists in the use of a strontium-sulfur-oxygen compound in connection with a compound of an alkaline metal or earth with fluorin and a highly refractory material fused with the usual ingredients of a lead glass batch, substantially in the proportions and in the manner hereinafter more specifically described.

I have found that by the use of the usual batch for lead glass, consisting substantially of sand, soda and an oxid of lead, preferably red oxid of lead, with the usual and ordinary fluxes, together with sulfur-oxygen compound of one of the alkaline earths, preferably strontium; a compound of fluorin with a metal or alkaline earth, preferably sodium; and a refractory material melting only at a very high temperature; a semi-opaque, semi-translucent glass can be manufactured whose general color is white or whitish and without "the color" or "the fire" ordinarily present in commercial opal glasses.

I have found in the development of my invention that the use of compounds of sulfur and oxygen, with either calcium, strontium, barium or magnesium, when used in connection with the fluorin-metal, fluorin-alkaline compound in said lead batch, have specific effects upon the color of the resultant glass produced from their admixture and fusion. That when all of the ingredients are melted in a closed pot until complete fusion takes place, that the stability of the color or opacity and the translucency is affected according to the sulfur-oxygen-strontium and the fluorin-metal or alkaline earth compounds used, some of which give better results than others. The use of some of these combinations of ingredients permits of greater control of the batch and the resultant glass made therefrom than others. These results, to a great extent, depend upon whether sulfur and oxygen are used with calcium, strontium, barium or magnesium in combination with fluorin combined with an alkaline earth or calcium, sodium, lead, magnesium or other metal or fluorin injected into the glass batch by means of the mineral cryolite. The reactions of the sulfur-oxygen compounds are quicker with magnesium and calcium than with strontium and barium, whose reactions take place as to speed in the order named, the last being the slowest. The same is true with reference to the fluorin compounds, the reaction is quickest with calcium in combination with fluorin and slower with sodium, and with any other metal with which fluorin is combined which can be used for glass making purposes. I have found that when the melting points of the sulfur-oxygen and fluorin compounds most nearly approach the melting points of the refractory materials used, preferably china-clay or alumina, the better the resultant glass will be as to color, texture, fusion and working qualities when blown or pressed.

I have also found that by the use of a sulfur-oxygen-strontium compound in connection with a fluorin metal or alkaline earth compound and a refractory material of the character of china clay or alumina, that the color or opacity or the translucency of the resultant glass can be controlled to almost any desired degree, for the reason that when such a combination of ingredients is fused in connection with the ordinary lead batch containing the ordinary fluxes, the glass can be perfectly fused and kept in the melting pot for a longer melting period without losing its opacity, color and translucency, (as is the case in ordinary semi-opaque, semi-translucent glasses), than when made with a lead batch and other combination of opacifying ingredients.

One of the formulas which will produce a semi-opaque, semi-translucent glass according to my invention, giving the ingredients thereof by weight, is substantially as follows:—

Sand, 100 parts; soda ash, 49 parts; red oxid of lead, 56 parts; feldspar, 120 parts; sodium fluorid, 7½ parts; strontium sulfate 1¾ parts; sodium chlorid, 5 parts; alumina, 22½ parts; niter, 5 parts; antimony ½ part.

Without departing from the spirit of my invention, the quantities of the ingredients as above given may be varied; litharge may be substituted for red oxid of lead, with proper adjustment as to oxygen content; calcic fluorid may be substituted for sodium fluorid, but at a disadvantage as to control of specific effects; any of the alkaline earths may be substituted for strontium, but at a disadvantage; cryolite may be substituted for sodium fluorid; any flux that would perform the functions of sodium chlorid, niter and antimony may in like manner be used with similar results.

After the ingredients, as hereinbefore set forth, have been mixed, they are placed in a closed pot and heated until a complete fusion has taken place and when the desired color and opacity has been obtained, as may be ascertained by trials taken from time to time, the glass is taken down and worked in the ordinary way by blowing or pressing to produce the desired commercial articles therefrom.

The preferred batch set forth heretofore weighs all told 367.25 pounds and contains two aluminum compounds, feldspar ($AlKSi_3O_8$) and alumina ($Al_2O_3$). The percentage of aluminum in these two compounds is respectively 9.7% and 53%, so that the feldspar contains 11.64 pounds of aluminum and the alumina contains 11.92 pounds of aluminum. The total weight of aluminum is therefore 23.56 pounds, which is 6.41% of the total batch. The fluorin in the batch is carried by the sodium fluorid ($NaF$), the percentage of fluorin being 45.2% or 3.39 pounds, which is .92% of the total batch. The 1.75 pounds of strontium sulfate is equal to .47% of the batch, and the sulfur contained therein is .08% of the total batch, while the 5 pounds of sodium chlorid is 1.36% of the total batch and the chlorin contained therein is .82% of the total batch. The aluminum, fluorin, sulfate and chlorid are the coloring agents and the foregoing percentages are set forth to indicate more clearly the relative proportions of these ingredients as compared with the total batch.

As heretofore set forth other substances containing the opacifying ingredients might be substituted if an adjustment is made to secure the proper quantity. The amount of the opacifying agents may also be varied between considerable limits depending upon the amount of color desired in the glass.

What I claim as my invention is:—

1. A semi-opaque, semi-translucent glass made by fusing together in a batch a substantially clear glass batch with aluminum, fluorin, chlorin and sulfur compounds.

2. A semi-opaque, semi-translucent glass made by fusing together in a batch a substantially clear glass batch with aluminum and fluorin compounds, a sulfate and a chlorid.

3. A semi-opaque, semi-translucent glass made by fusing together in a batch a substantially clear glass batch with compounds containing aluminum, fluorin, chlorin and a sulfate, with the aluminum in excess of the fluorin.

4. A semi-opaque, semi-translucent glass made by fusing together in a batch a substantially clear glass batch with aluminum, fluorin, chlorin and sulfur compounds, the amount of aluminum in the total batch ranging about 6%, and the fluorin about 1%.

5. A semi-opaque, semi-translucent glass made by fusing together in a batch a substantially clear glass batch with aluminum, fluorin, chlorin and sulfur compounds, the amount of aluminum in the total batch ranging about 6%, the fluorin about 1%, and the chlorin and sulfur together about 1%.

6. A semi-opaque, semi-translucent glass made by fusing together in a batch a substantially clear glass batch with aluminum and fluorin compounds, a sulfate and a chlorid, the amount of aluminum in the total batch ranging from about 6%, the fluorin about 1%, and the sulfate and sodium chlorid together ranging from about 2%.

7. A semi-opaque, semi-translucent glass made by fusing together in a batch a substantially clear glass batch with aluminum and fluorin compounds, and strontium sulfate.

8. A semi-opaque, semi-translucent glass made by fusing together in a batch a substantially clear glass batch with aluminum and fluorin compounds, a chlorid and strontium sulfate.

In witness whereof I have hereunto set my hand in the presence of two subscribing witnesses.

JOSEPH J. MILLER.

Witnesses:
JAMES F. CALLAHAN,
A. M. NEEPER.